(12) United States Patent
Sayyar-Rodsari (10) Patent No.: US 8,682,635 B2
(45) Date of Patent: Mar. 25, 2014

(54) OPTIMAL SELF-MAINTAINED ENERGY MANAGEMENT SYSTEM AND USE

(75) Inventor: Bijan Sayyar-Rodsari, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 512 days.

(21) Appl. No.: 12/790,488

(22) Filed: May 28, 2010

(65) Prior Publication Data

US 2011/0295585 A1   Dec. 1, 2011

(51) Int. Cl.
*G06F 17/50* (2006.01)

(52) U.S. Cl.
USPC ............................................. 703/18

(58) Field of Classification Search
USPC ........................................ 703/18; 700/291
See application file for complete search history.

(56) References Cited

U.S. PATENT DOCUMENTS

| | | | |
|---|---|---|---|
| 5,289,362 A | | 2/1994 | Liebl et al. |
| 6,934,931 B2 * | | 8/2005 | Plumer et al. ................. 717/104 |
| 7,085,660 B2 * | | 8/2006 | Mansingh et al. .............. 702/60 |
| 7,274,975 B2 | | 9/2007 | Miller |
| 7,343,360 B1 | | 3/2008 | Ristanovic et al. |
| 7,454,270 B2 | | 11/2008 | Mansingh et al. |
| 7,552,100 B2 | | 6/2009 | Chen |
| 7,630,868 B2 * | | 12/2009 | Turner et al. ...................... 703/2 |
| 7,844,351 B2 * | | 11/2010 | Piche .............................. 700/36 |
| 8,019,701 B2 | | 9/2011 | Sayyar-Rodsari et al. |
| 2004/0167677 A1 | | 8/2004 | Weiss |
| 2005/0187643 A1 | | 8/2005 | Sayyar-Rodsari et al. |
| 2005/0234600 A1 | | 10/2005 | Boucher et al. |
| 2008/0177423 A1 | | 7/2008 | Brickfield et al. |
| 2008/0208778 A1 | | 8/2008 | Sayyar-Rodsari et al. |
| 2011/0066298 A1 * | | 3/2011 | Francino et al. ............... 700/290 |

OTHER PUBLICATIONS

E. Industrial Technologies Program, "Energy Technology Solutions: Public-Private Partnerships Transforming Industry." DOE, 2007.
E Borer, "Operational Impacts of Energy Management at Princeton." www.icetec.biz/presentations/NJHEPS/pdf/Borer,Edward_Operational_Impacts_of_Energy_management.pdf: NJHEPS. Energy Management Workshop, 2004.
D. Himes, "Energy Cost Savings at Rice through Visibility into University Energy Consumption Components." http://www.managingautomation.com/maonline/news/read/Incuity_Embarks_ON_a_Vertical_Market_Strategy_31980: Managing Automation, 2008.
A. Wright, M. Martin, S. Nimbalkar, J. Quinn, S. Glatt, and B. Orthwein, "Results from the U.S. DOE 2007 Save Energy Now Assessment Initiative." Oak Ridge National Laboratory and DOE Industrial Technologies Program, Apr. 2009.
E. Industrial Technologies Program, "Energy Technology Solutions: Public-Private Partnerships Transforming Industry." DOE, Oct. 2007.

* cited by examiner

*Primary Examiner* — Omar Fernandez Rivas
*Assistant Examiner* — Herng-Der Day
(74) *Attorney, Agent, or Firm* — Fletcher Yoder, P.C.; William R. Walbrun; John M. Miller (57) ABSTRACT

The present invention provides novel techniques for controlling energy systems. In particular, parametric hybrid models may be used to parameterize inputs and outputs of groups of equipment of energy systems. Each parametric hybrid model may include an empirical model, a parameter model, and a dynamic model. Critical parameters for groups of equipment modeled by the parametric hybrid models, which are correlated with, but not the same as, input and output variables of the groups of equipment may be monitored during operation of the energy system. The critical parameters may be used to generate optimal trajectories for the energy system, which may be used to control the energy system.

20 Claims, 6 Drawing Sheets

OPTIMAL SELF-MAINTAINED ENERGY MANAGEMENT SYSTEM AND USE

BACKGROUND

The present invention generally relates to the field of control systems. More particularly, the present invention relates to systems and methods for energy management control systems using parametric hybrid models.

BRIEF DESCRIPTION

Commercial and industrial sectors account for roughly 50% of total energy use in the United States. Improving their energy efficiency will enhance their competitiveness, reduce the overall energy consumption per unit of produced/consumed goods and services, and improve their environmental impact (e.g., mitigating emissions and reducing fossil-fuel consumption).

Consumers of energy in virtually every industrial sector, including auto manufacturing, food and beverage, chemical and petrochemical, metals and mining, data centers, and biorefineries, have recognized the benefits of energy and emission reduction measures. Large commercial complexes, such as medical centers and university campuses, have also recognized such benefits. With 10% of all generation assets and 25% of the distribution infrastructure currently used only 5% of the time, opportunities are ripe for improvements in network efficiency.

To date, however, only a relatively limited subset of the overall energy savings and efficiency improvement opportunities have been targeted in practice. To target broader energy-saving and efficiency opportunities, to reduce the implementation gap, and to sustain the realized savings and efficiencies in a cost-effective manner, energy efficiency decisions must be made in the context of a holistic view of the energy system operation. Furthermore, the implemented energy management system must be self-maintaining.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
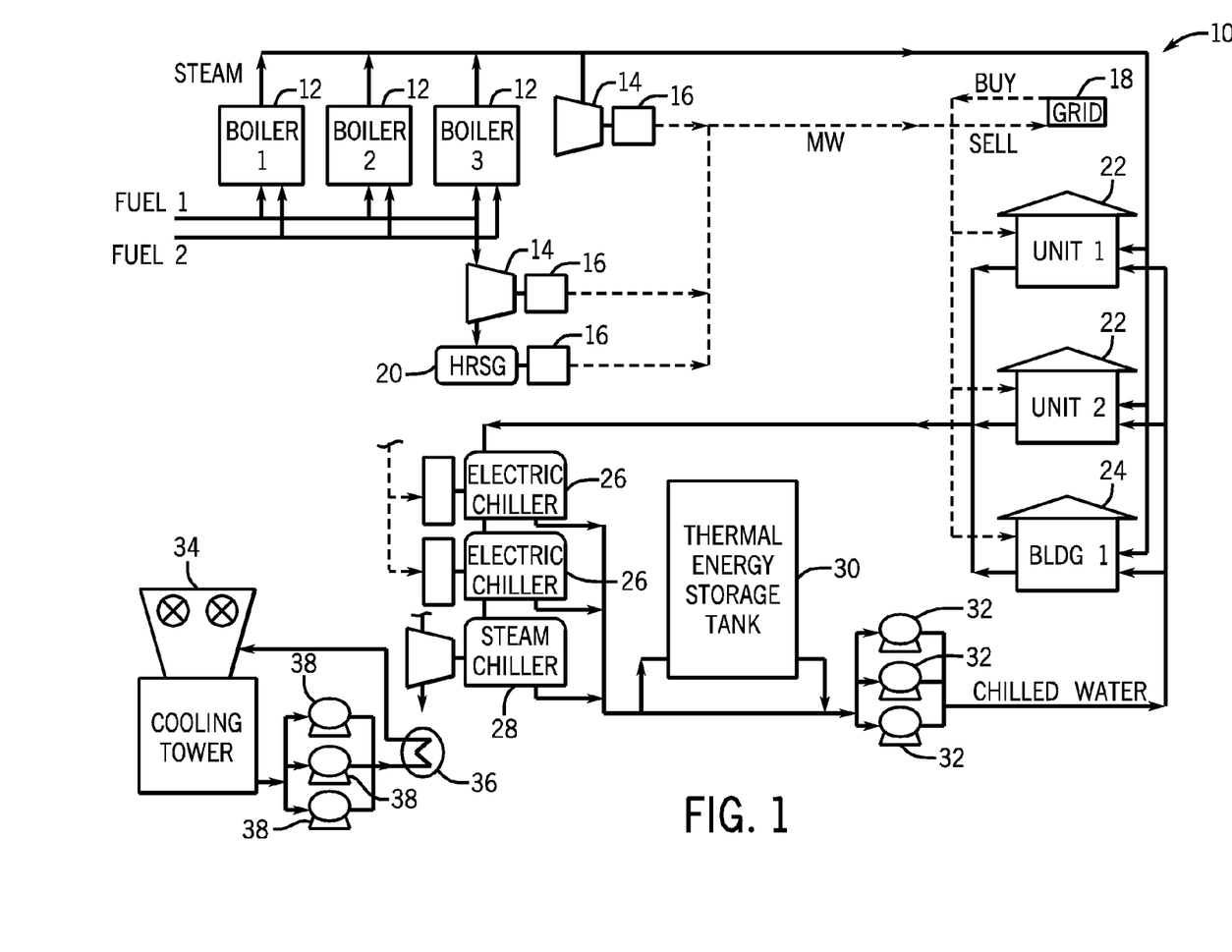
FIG. 1 is a schematic diagram of an exemplary commercial or industrial energy system.

Turning now to the drawings, FIG. 1 is a schematic diagram of an exemplary commercial or industrial energy system 10. In particular, FIG. 1 illustrates the various energy generation and consumption components that are typical in commercial and industrial energy systems. For example, FIG. 1 includes boilers 12 that are configured to receive fuel and generate steam for use as a source of power in other components of the energy system 10. For example, in certain embodiments, the steam produced by the boilers 12 may be used by cogeneration units 14 to drive generators 16, which generate electrical power that may be consumed by components of the energy system 10 and/or sold to an electrical grid 18. In addition, in certain embodiments, a heat recovery steam generation (HRSG) system 20 may be used for secondary recovery of heat through generation of steam, which may also be used to drive generators 16 for generating electrical power. In addition to selling electricity to the grid 18, the energy system 10 may also buy electricity from the grid 18. Whether the energy system 10 buys from or sells to the grid 18 at any particular point in time depends on the current electricity supply of the energy system 10, the current electricity demand of the energy system 10, electrical storage capacity of the energy system 10, buy/sell prices to and from the grid 18, day/night cycles of the energy system 10, the availability and capacity of other generation systems connected to the grid 18, and so forth.

As illustrated, the energy system 10 may include process units 22 and buildings 24 that consume some of the electrical power, chilled water, and/or steam. In addition, in certain embodiments, the energy system 10 may include electric chillers 26 and steam chillers 28, which may be associated with a thermal energy storage tank 30, and may consume energy to generate chilled water, which may be pumped to the process units 22 and buildings 24 by pumps 32 for cooling, such as for building cooling, industrial process cooling, and so forth. In addition, heated water from, for example, the chillers 26, 28 may be circulated through a cooling tower 34 and associated heat exchangers 36 and pumps 38, where the heated water is cooled for later use.

Therefore, in summary, various components may produce energy and/or consume energy in a typical commercial or industrial energy system 10. Indeed, the components shown in FIG. 1 are merely exemplary of the components that may comprise a typical commercial or industrial energy system 10. As illustrated in FIG. 1, the various components of the energy system 10 may be configured to consume and/or produce energy based upon different technologies. The interdependence of the components of the energy system 10 may, in certain embodiments, be extremely complex. In addition, various external components, such as the electrical grid 18 may add to the complexity of the energy system 10.

Figure 2:
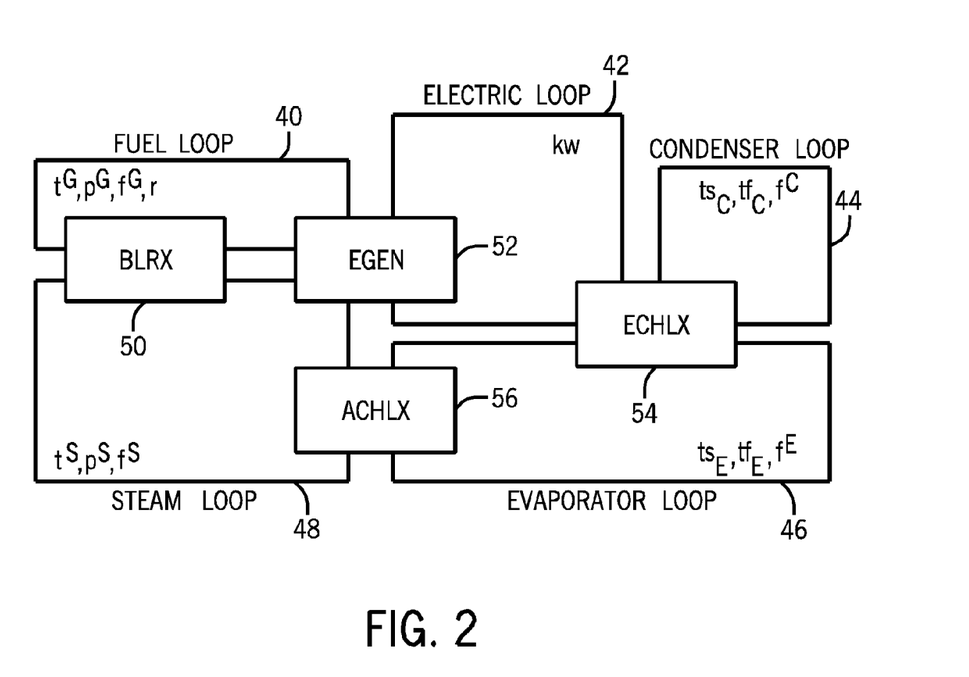
FIG. 2 is a block diagram of exemplary components of the energy system of FIG. 1, illustrating various interconnections.

For example, FIG. 2 is a block diagram of exemplary components of the energy system 10 of FIG. 1, illustrating various interconnections. In particular, FIG. 2 depicts various energy loops that are typical in commercial and industrial energy systems 10. For example, key energy loops include a fuel loop 40, an electric loop 42, a condenser loop 44 (e.g., cooling tower water), an evaporator loop 46 (e.g., chiller water), and a steam loop 48. The various energy loops 40, 42, 44, 46, 48 illustrated in FIG. 2 are merely exemplary and not intended to be limiting. In other embodiments, other energy loops may be used to model the energy system 10.

Each energy loop 40, 42, 44, 46, 48 includes a set of defining variables that function as inputs and outputs for the respective energy loop 40, 42, 44, 46, 48. For example, the fuel loop 40 includes $t^G$, $p^G$, $f^G$, and r, where $t^G$ is the fuel temperature, $p^G$ is the fuel pressure, $f^G$ is the fuel flow rate, and r is the heat factor for the fuel loop 40. The electric loop 42 includes kw, which is the amount of electricity supplied.

The condenser loop 44 includes $ts_C$, $tf_C$, and $f^C$, where $ts_C$ is the temperature of the water entering the cooling tower(s), $tf_C$ is the temperature of the water exiting the cooling tower(s), and $f^C$ is the flow rate for the water in the condenser loop 44. The evaporator loop 46 includes $ts_E$, $tf_E$, and $f^E$, where $ts_E$ is the temperature of the chilled water leaving the chillers, $tf_E$ is the temperature of the chilled water returning to the chillers, and $f^E$ is the chilled water flow rate. The steam loop 48 includes $t^S$, $p^S$, and $f^S$, where $t^S$ is the steam temperature, $p^S$ is the steam pressure, and $f^S$ is the steam flow. Again, all of the variables for the energy loops 40, 42, 44, 46, 48 illustrated in FIG. 2 are merely exemplary and not intended to be limiting. In other embodiments, other variables may be used to define the energy loops 40, 42, 44, 46, 48.

As illustrated, the energy loops 40, 42, 44, 46, 48 are coupled to component blocks, which represent groups of actual energy-related equipment of the energy system 10 that typically supply energy to or consume energy from the energy loops 40, 42, 44, 46, 48. For example, a boiler block 50 is coupled to both the fuel loop 40 and the steam loop 48, an electrical generator block 52 is coupled to the fuel loop 40, the electric loop 42, and the steam loop 48, an evaporation chiller block 54 is coupled to the electric loop 42, the condenser loop 44, and the evaporator loop 46, and an absorption chiller block 56 is coupled to the evaporator loop 46 and the steam loop 48. Again, the various component blocks 50, 52, 54, 56 illustrated in FIG. 2 are merely exemplary and not intended to be limiting. In other embodiments, other component blocks may be coupled to the various energy loops 40, 42, 44, 46, 48.

The disclosed embodiments enable energy-efficient operation of energy systems 10, such as industrial plants, commercial facilities (such as large commercial buildings, hospitals, large supermarkets), university campuses, and large residential complexes, by ensuring that the individual components of the energy system 10 continuously operate in the most efficient and economically optimal state. In particular, the disclosed embodiments include systems and methods for managing energy systems 10 that include building parametric hybrid models for the individual component blocks (e.g., groups of equipment) of an energy system 10, and combining these parametric hybrid models into a holistic model representing the energy system 10. In particular, the disclosed embodiments target optimization of the energy system 10 that addresses the computational complexity challenge of modeling the many various energy-related components of the energy system 10, including individual parametric hybrid models for generation units, boilers, chillers, pumps and fans, and so forth, as well as parametric hybrid models for constraints and objectives. In addition, the disclosed embodiments provide for online modification of model parameters (either through automatic training or via external inputs).

In addition, parametric objective functions may be built to reflect the economic objectives of the operation of the energy system 10. A parametric constraint set may be built to reflect constraints of the operation of the energy system 10 (e.g. constraints on cooling capacity, constraints on allowable emissions, and so forth). A training mechanism may also be built to modify the parameters in the parametric hybrid models, parametric objective functions, and parametric constraint sets of the energy system 10, given updated operation data. Energy load models may also be built to predict load profiles over the operation time horizon. The load models may include, for example, chilled water demand, steam demand, electricity demand, and so forth. Based on all of these models and objectives, the optimization problem for the energy system 10 may then be solved to determine the optimal profile for the operating conditions of the energy system 10, subject to the parametric constraint set.

Because of the complexity of typical commercial and industrial energy systems 10, the hybrid techniques described herein provide unique advantages. Hybrid techniques leverage known fundamental relationships (known kinetic models, and so forth) that are more or less available from fundamental process modeling with empirical modeling techniques for phenomena not accurately modeled due to a lack of fundamental understanding. Because industrial-scale energy equipment is generally uniquely designed and developed for intensive operations, significant calibration or tuning of published or available fundamental modeling with specifically-designed empirical modeling techniques provides more accurate energy models. In turn, a more accurate energy model enables a more highly performing model-based control solution. Therefore, an ideal modeling solution incorporates the best available fundamental models and empirical models tuned or calibrated to best match collected energy equipment measurement/performance data over varying operating phases of the energy system 10. Depending on the accuracy of the parametric hybrid models, either linear (e.g. single value) parameters or nonlinear (e.g. kinetic parameters that vary with measured energy) variables can be identified and used.

Figure 3:
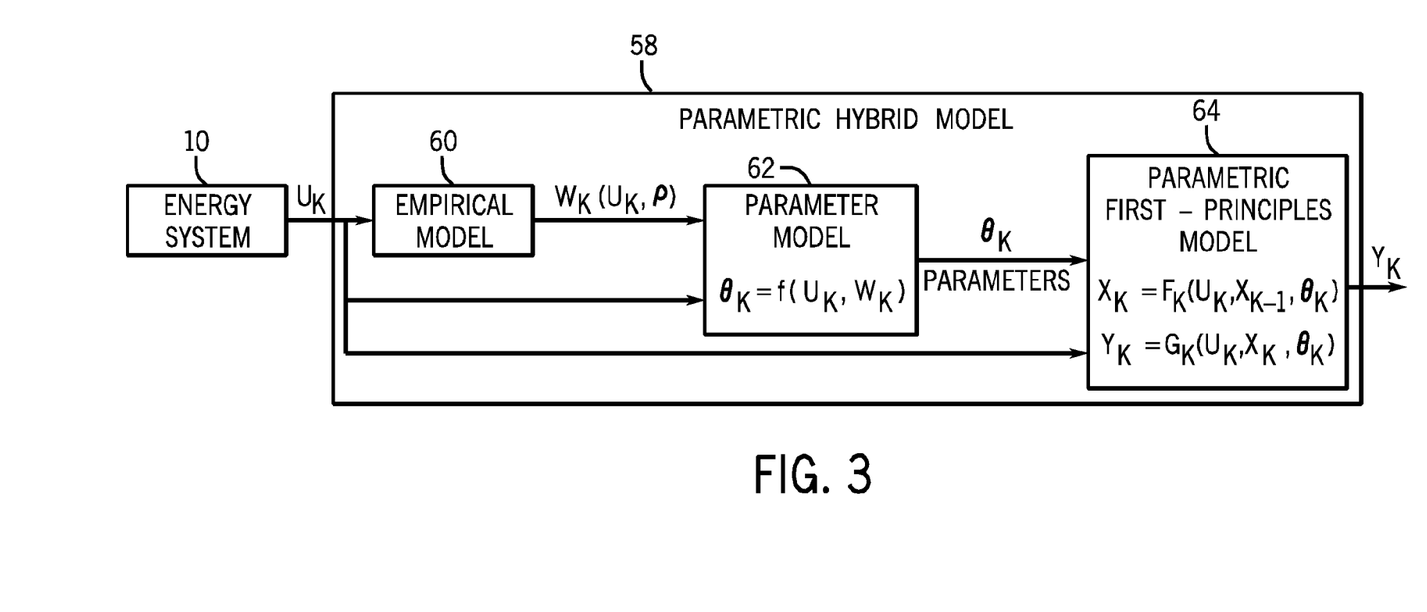
FIG. 3 is a block diagram of an exemplary parametric hybrid model for modeling the energy system of FIG. 1.

FIG. 3 is a block diagram of an exemplary parametric hybrid model 58 for modeling the energy system 10 and/or, more particularly, individual component blocks 50, 52, 54, 56 of the energy system 10. As illustrated, energy variable inputs $u_k$ from the energy system 10 may be received by the parametric hybrid model 58. The energy variable inputs $u_k$ may, for example, include the variables of the energy loops 40, 42, 44, 46, 48 described above. An empirical model 60 may use the energy variable inputs $u_k$ to generate empirical model outputs $w_k$. The empirical model outputs $w_k$ may be a function of the energy variable inputs $u_k$ and empirical model parameters $\rho$. Both the empirical model outputs $w_k$ and the energy variable inputs $u_k$ may be directed into a parameter model 62 of the parametric hybrid model 58. Fundamental model parameters $\theta_k$ from the parameter model 62 may be a function of the energy variable inputs $u_k$ and the empirical model outputs $w_k$. In certain embodiments, the fundamental model parameters $\theta_k$ may include the empirical model outputs $w_k$, or may simply be identical to the empirical model outputs $w_k$ in their simplest form. The fundamental model parameters $\theta_k$ may be directed into a parametric first-principles model 64, which may be either a steady-state or dynamic model. In addition, the parametric first-principles model 64 may receive the energy variable inputs $u_k$ from the energy system 10. The parametric first-principles model 64 may model measured or unmeasured energy state variables $x_k$ and energy variable outputs $y_k$. The energy state variables $x_k$ may be a function of the energy variable inputs $u_k$, previous energy state variables $x_{k-1}$, and the fundamental model parameters $\theta_k$. The energy variable outputs $y_k$ may be a function of the energy variable inputs $u_k$, current energy state variables $x_k$, and the fundamental model parameters $\theta_k$. The energy variable outputs $y_k$ may be directed from the parametric hybrid model 58 as outputs. Therefore, the general equations defining the parametric hybrid model 58 include:

$$w_k = f_1(u_k, \rho);$$

$$\theta_k = f_2(u_k, w_k);$$

$$x_k = F_k(u_k, x_{k-1}i, \theta_k); \text{ and}$$

$$y_k = G_k(u_k, x_k, \theta_k);$$

where $u_k$ is a vector of energy variable inputs over time k, $\rho$ is a vector of empirical model parameters, $w_k$ is a vector of empirical model outputs over time k, $\theta_k$ is a vector of fundamental model parameters over time k, $x_k$ is a vector of measured or unmeasured energy state variables over time k, and $y_k$ is a vector of energy variable outputs over time k.

The parametric hybrid model 58 is extremely efficient for real-time optimization and control computations. This computational efficiency is critical to the successful implementation of a model-based control strategy that optimizes the performance of the energy system 10. Dynamic optimization methods are used to calculate optimal dynamic trajectories during operation of the energy system 10 to optimize the efficiency of the energy system 10 as a whole. In particular, trajectories may be calculated for individual components of the component blocks 50, 52, 54, 56 of the energy system 10 and optimized to a target over time based on parameters that are closely related to, but are not the same as, the input and output variables which are listed above as being associated with the various energy loops 40, 42, 44, 46, 48. More specifically, as illustrated in FIG. 3, the fundamental model parameters $\theta_k$ generated by the parameter model 62 may be a set of parameters that are not directly analogous to either the energy variable inputs $u_k$ or the energy variable outputs $y_k$. Rather, certain derived measures (e.g., the parameters) of the energy system 10 over the course of operation of the energy system 10 may be used to generate trajectories that strongly correlate to performance variables for the energy system 10, even when the performance variables for the energy system 10 are not directly measurable.

For example, as described in greater detail below, the efficiency of a boiler may not be measured during operation of the energy system 10, and may be used as a parameter, which correlates to, but is not that same as, energy variable inputs and outputs $u_k$, $y_k$ for the boiler component block 50. Therefore, this parameter may be calculated during operation of the energy system 10 (and, more specifically, the components of the boiler component block 50) with the parametric hybrid models 58, and may be used in calculating an optimal trajectory for an input to the boiler (e.g. the firing rate of the boiler). This allows better real-time control during operation of the energy system 10, such that intermediate performance of the energy system 10 may be more closely targeted and maintained. In certain embodiments, an optimal trajectory function may be determined by solving:

$$\min(u_k)\Gamma(\hat{y}_k, \hat{y}_k^{Trajectory}), \text{subject to:}$$

$$w_k = f_1(u_k, \rho);$$

$$\theta_k = f_2(u_k, w_k);$$

$$x_k = F_k(u_k, x_{k-1}, \theta_k);$$

$$y_k = G_k(u_k, x_k, \theta_k); \text{ and}$$

$$L < u_k < H;$$

where $\Gamma(\ )$ is the objective function defined over energy variable outputs, $\hat{y}_k$ is the energy variable outputs ($\hat{y} \in y$), and $\hat{y}_k^{Trajectory}$ is an explicit or implicit representation of a desired energy variable trajectory. In addition, constraints (e.g., L and H above) may be trajectory functions. The minimization of the above objective function is achieved through adjustments to the decision variables $u_k$ (e.g., the energy variable inputs). Note that the optimization problem above is merely exemplary and not intended to be limiting. For example, the objective function $\Gamma(\ )$ may be defined to include penalties on decision variables $u_k$.

The dynamic optimization described above may be implemented using various methods. The level of detail included in the parametric hybrid models 58 may vary depending upon the level of complexity that may be handled in real time. In other words, the parametric hybrid modeling allows a systematic way of compromising between model accuracy and computational complexity and, therefore, offers flexibility to handle energy systems 10 of varying levels of complexity. More specifically, the complexity of any given parametric hybrid model 58 is a function of both the complexity of the system being modeled, and the simplicity of the parametric hybrid model 58 needed to make real-time computations tractable. As such, the parametric hybrid model framework offers a systematic framework for optimally trading off model accuracy versus computational efficiency. In defining parametric hybrid models 58, in certain embodiments, short-cut models may be used (e.g., in the parametric first-principles models 64). These short-cut models may be linear or nonlinear, dynamic or steady-state, and so forth. The parametric hybrid model framework remains current with the real-time operating conditions of the energy system 10, and allows for online modification of the model parameters, which are not direct inputs or outputs of the energy system 10, and hence the decision engine (i.e., the optimization and control) always has valid models upon which to base decisions.

The parametric hybrid model 58 models both steady-state and the non-steady-state behavior of the processes of the energy system 10, whether the behavior is linear or nonlinear, with respect to critical variables, where gains and/or dynamics vary during operation of the energy system 10. The optimal energy management system has: (1) parametric hybrid models 58 of the components of the energy system 10, (2) parametric hybrid models 58 of how these components are connected together to define the energy system 10, (3) a description of what the performance objectives are, and (4) a description of what the constraints are. Some of the variables (e.g., the parameters described herein) that are indicative of performance of the energy system 10 (or individual components of the energy system 10) may not be measured or even easily measurable. The parametric hybrid models 58 are used to model these variables (e.g., the parameters described herein) as well. Then, an optimizer may make decisions as to which inputs to the energy system 10 should be given system models/objectives/constraints. As such, the parametric hybrid model framework allows all of the models to remain current, while solving the optimization problem (i.e., making decisions) as quickly as possible. Achieving these two goals enables the optimal energy management system described herein to continuously make the best decisions based on what is actually happening with the energy system 10 in real-time.

Figure 4:
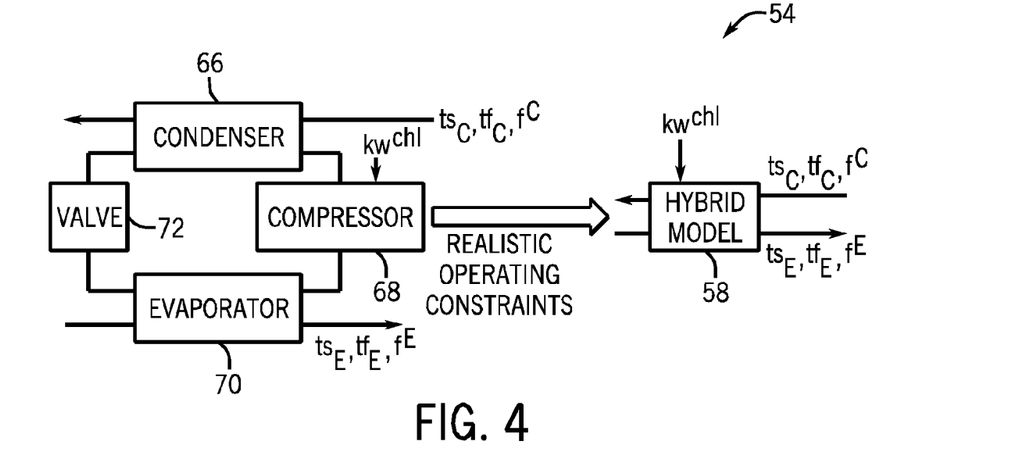
FIG. 4 is a block diagram of an exemplary evaporation chiller block of FIG. 2.

As described above with respect to FIG. 2, each component block 50, 52, 54, 56 may be associated with energy loops 40, 42, 44, 46, 48 that contribute to operation of the component block 50, 52, 54, 56. In addition, each component block 50, 52, 54, 56 will include actual energy-related equipment components. Moreover, each component block 50, 52, 54, 56 may be modeled by a parametric hybrid model 58 as described above with respect to FIG. 3. For example, FIG. 4 is a block diagram of an exemplary evaporation chiller block 54 of FIG. 2. As illustrated, the evaporation chiller block 54 may include a condenser 66, a compressor 68, an evaporator 70, and a valve 72. As such, the evaporation chiller block 54 may be associated with the condenser loop 44 (e.g., the condenser 66), the electric loop 42 (e.g., the compressor 68), and the evaporator loop 46 (e.g., the evaporator 70).

Accordingly, the variables of the condenser loop 44, the electric loop 42, and the evaporator loop 46 will be associated with the evaporation chiller block 54. More specifically, the variables $ts_C$, $tf_C$, $f^C$, kw, $ts_E$, $tf_E$, and $f^E$ comprise input and output energy variables $u_k$, $y_k$ for the evaporation chiller block 54. However, a parametric hybrid model 58 may be built that incorporates fundamental models for the condenser 66, compressor 68, evaporator 70, and valve 72 (e.g., in a parameter model 62), empirical data relating to the condenser 66, compressor 68, evaporator 70, and valve 72 (e.g., in an empirical model 60), and a parametric first-principles model 64 for the evaporation chiller block 54. From this, the parametric hybrid model 58 of the evaporation chiller block 54 will model critical parameters $\theta_k$ of the evaporation chiller block 54. These critical parameters $\theta_k$ are different from the input and output energy variables $u_k$, $y_k$ for the evaporation chiller block 54. However, they correlate with performance criteria of the evaporation chiller block 54. For example, critical parameters of the evaporation chiller block 54 may include entropy production, thermal resistance, and heat leak. These parameters correlate well with, but are not equal to, the input and output energy variables $u_k$, $y_k$ for the evaporation chiller block 54 (e.g., $ts_C$, $tf_C$, $f^C$, kw, $ts_E$, $tf_E$, and $f^E$).

Figure 5:
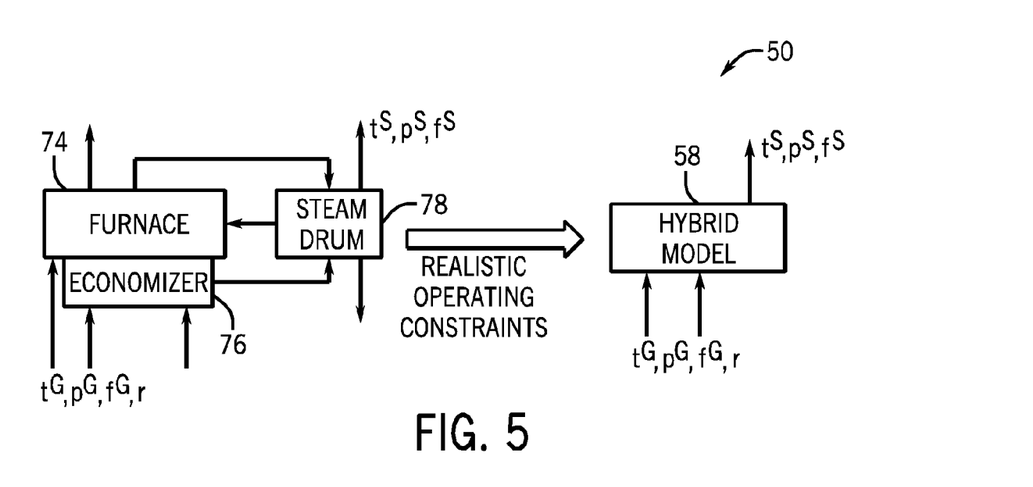
FIG. 5 is a block diagram of an exemplary boiler block of FIG. 2.

As another example, FIG. 5 is a block diagram of an exemplary boiler block 50 of FIG. 2. As illustrated, the boiler block 50 may include a furnace 74, an economizer 76, and a steam drum 78. As such, the boiler block 50 may be associated with the fuel loop 40 (e.g., the furnace 74 and the economizer 76) and the steam loop 48 (e.g., the steam drum 78). Accordingly, the variables of the fuel loop 40 and the steam loop 48 will be associated with the boiler block 50. More specifically, the variables $t^G$, $p^G$, $f^G$, r, $t^S$, $p^S$, and $f^S$ comprise input and output energy variables $u_k$, $y_k$ for the boiler block 50. However, a parametric hybrid model 58 may be built that incorporates fundamental models for the furnace 74, economizer 76, and steam drum 78 (e.g., in a parameter model 62), empirical data relating to the furnace 74, economizer 76, and steam drum 78 (e.g., in an empirical model 60), and a parametric first-principles model 64 for the boiler block 50. From this, the parametric hybrid model 58 of the boiler block 50 may generate models for critical parameters $\theta_k$ of the boiler block 50. These critical parameters $\theta_k$ are different from the input and output energy variables $u_k$, $y_k$ for the boiler block 50. However, they correlate with performance criteria of the boiler block 54. For example, critical parameters of the boiler block 50 may include the efficiency of the furnace. This parameter correlates well with, but is not equal to, the input and output energy variables $u_k$, $y_k$ for the boiler block 50 (e.g., $t^G$, $p^G$, $f^G$, r, $t^S$, $p^S$, and $f^S$.

Therefore, parametric hybrid models 58 can be built for various component blocks 50, 52, 54, 56 of the energy system 10. Components of the component blocks 50, 52, 54, 56 may include power generation units, such as gas turbines, wind turbines, solar panels, and so forth. As described above, an electricity grid 18 may also be considered as a power generation source, and may be modeled using the parametric hybrid models 58. Other components of the component blocks 50, 52, 54, 56 that may be modeled include chillers (e.g., such as illustrated in FIG. 4), boilers (e.g., such as illustrated in FIG. 5), cooling towers, pumps, fans, motors, thermal storage units, and so forth. In addition, parametric hybrid models 58 may be developed for loads, such as steam loads, chilled water loads, electricity loads, and so forth. Furthermore, other parametric hybrid models 58 may be developed for various power generation sources and power consumption components. In addition, not only may parametric hybrid models 58 be developed for component blocks 50, 52, 54, 56, such as those illustrated in FIG. 2, but parametric hybrid models 58 of the interconnections (e.g., the energy loops 40, 42, 44, 46, 48) between the components may be also be developed.

The parametric hybrid models 58 will capture the performance and economics of the operation of the energy system 10, operational constraints of the energy system 10, existing knowledge regarding operation of the energy system 10, and objectives for the operation of the energy system 10. The optimal operating conditions of the energy system 10 may be determined via a systematic optimization problem using an appropriate solver (e.g., an algorithmic search for the best solution). However, in other embodiments, the optimal operating conditions of the energy system 10 may be determined using heuristic searches, rule-based reasoning, fuzzy logic, and so forth. Another aspect of the disclosed embodiments is the ability to modify the parameters of the parametric hybrid models 58 defining the energy system 10 based on updated data regarding new operating conditions of the energy system 10.

Various embodiments of systems and methods for applying parametric hybrid models 58 are described below. In this approach, the parametric hybrid models 58 that define the energy system 10 may be incorporated as an integrated model in a parametric hybrid model-based energy system manager/controller. This system may project or predict what will happen in the energy system 10 based on the integrated parametric hybrid model and recent historical data including, for example, recent operating conditions and/or state values, and predictions of weather/load that may be obtained from many resources, including other parametric hybrid models 58, among other things. This projection or prediction may be updated or biased based on received current information, specified objectives, and/or constraints of the energy system 10. Optimization algorithms may be used to estimate the best current and future control adjustments on the model inputs to achieve a desired response of the energy system 10. Targets are set and the integrated parametric hybrid model outputs may be compared to how that output behaves in order to maintain the desired accuracy of the integrated parametric hybrid models.

Figure 6:
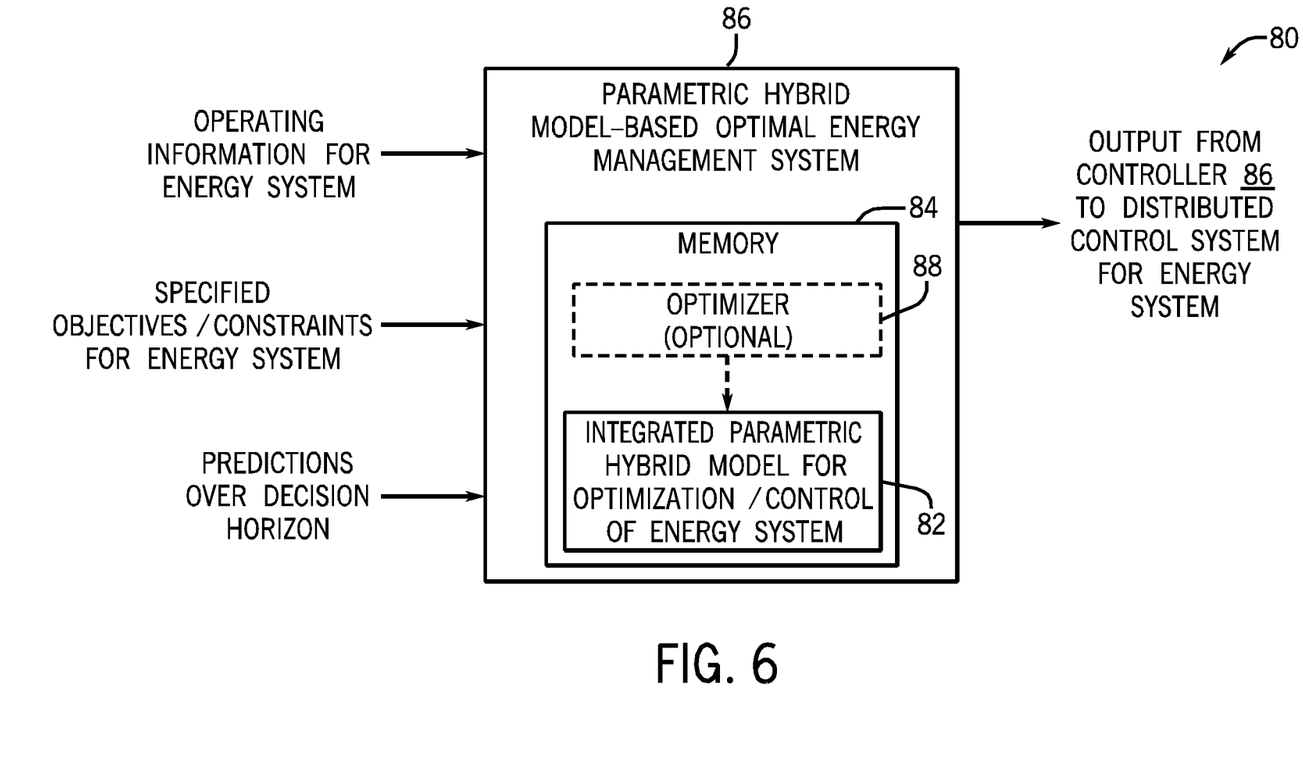
FIG. 6 is a block diagram of an exemplary control system for controlling the energy system using parametric hybrid models.

FIG. 6 is a block diagram of an exemplary control system 80 for controlling the energy system 10 using the parametric hybrid models 58 described herein. The control system 80 may comprise: 1) an integrated parametric hybrid model 82 (e.g., integrating all of the individual parametric hybrid models 58 that define the energy system 10) stored in a memory medium 84; and 2) a parametric hybrid model-based optimal energy management system 86 (e.g., a controller) coupled to the memory medium 84. The optimal energy management system 86 may be operable to receive operating information related to the energy system 10, receive specified objectives and constraints for the energy system 10, receive predictions of the weather, load, availability of components of the energy system 10 (e.g., over a temporal decision horizon), execute the integrated parametric hybrid model 82 in accordance with the objectives, constraints, predictions, and desired trajectories for the energy system 10 (e.g., over a temporal decision horizon) using the received corresponding operating information as input, to generate an updated instance of the integrated parametric hybrid model 82. The updated instance of the integrated parametric hybrid model 82 may be used to generate model output comprising target values for one or more variables related to the energy system 10 in accordance with the objectives, constraints, and predictions for the energy system 10. In addition, the optimal energy management system 86 may control the energy system 10 in accordance with the corresponding target values for the energy system 10.

In certain embodiments, an objective may include multiple objectives (i.e., may actually comprise a plurality of objectives and sub-objectives). In certain embodiments, the objective may involve multiple variables (e.g., a ratio of variables). Moreover, in certain embodiments, there may be a global objective (e.g., maximize efficiency) and multiple sub-objectives that may in some cases be at odds with the global objective and/or one another.

In certain embodiments, the optimal energy management system 86 may output the target values to a distributed control system for the energy system 10. In certain embodiments, the target values may include or be one or more trajectories of values over a time horizon (e.g., over a prediction or control horizon). Operating information may include measurements of a plurality of energy-related variables for the energy system 10 and/or information about one or more disturbance variables related to the energy system 10. Operating information may be received from the distributed control system for the energy system 10, entered by an operator, or provided by a program. For example, in addition to values read (by sensors) from the actual system, the operating information may include output from inferred property models (e.g., virtual online analyzers (VOAs)), perhaps produced by a parametric hybrid model 58, among other information sources.

The control system 80 may include one or more computer systems which interact with the energy system 10 being controlled. The computer system may represent any of various types of computer systems or networks of computer systems, which execute software program(s) according to various embodiments described herein. The computer system stores (and executes) software for managing the energy system 10. The software program(s) may perform various aspects of modeling, prediction, optimization, and/or control of the energy system 10. In some contexts, such systems may be referred to as automation controllers. Thus, the automated control system 80 may implement parametric hybrid model control of the energy system 10. The control system 80 may further provide an environment for making optimal decisions using an optimization solver (i.e., an optimizer 88) and carrying out those decisions (e.g., to control the energy system 10). The control system 80 may also provide an environment for a scheduling process of programmatically retrieving operating information relevant to the energy system 10, and generating actions (e.g., control actions) to control the energy system 10.

The one or more computer systems preferably include the memory medium 84 on which computer programs according to the present invention are stored. The term "memory medium" is intended to include various types of memory or storage, including an installation medium (e.g., a CD-ROM, or floppy disks), a computer system memory or random access memory such as DRAM, SRAM, EDO RAM, Rambus RAM, and so forth, or a non-volatile memory such as a magnetic medium (e.g., a hard drive), or optical storage. The memory medium 84 may comprise other types of memory as well, or combinations thereof. The memory medium 84 (which may include a plurality of memory media) preferably stores one or more software programs for performing various aspects of parametric hybrid control and optimization. In certain embodiments, the memory medium 84 may be part of the optimal energy management system 86. In other embodiments, the memory medium 84 may be separate from the optimal energy management system 86 and connected via a bus or a communication network. In certain embodiments, the memory medium 84 may include a plurality of memory media, with different portions of the model 82 stored in two or more of the memory media (e.g., via a storage area network, or other distributed system). In addition, the memory medium 84 may be located in a first computer in which the programs are executed, or may be located in a second different computer, which connects to the first computer over a network. In the latter instance, the second computer provides the program instructions to the first computer for execution. A CPU executing code and data from the memory medium 84 comprises a means for creating and executing the software programs according to the methods described herein. The computer systems may take various forms, including a personal computer system, mainframe computer system, workstation, network appliance, Internet appliance, or other device. In general, the term "computer system" can be broadly defined to encompass any device (or collection of devices) having a processor (or processors), which executes instructions from the memory medium 84.

Figure 7:
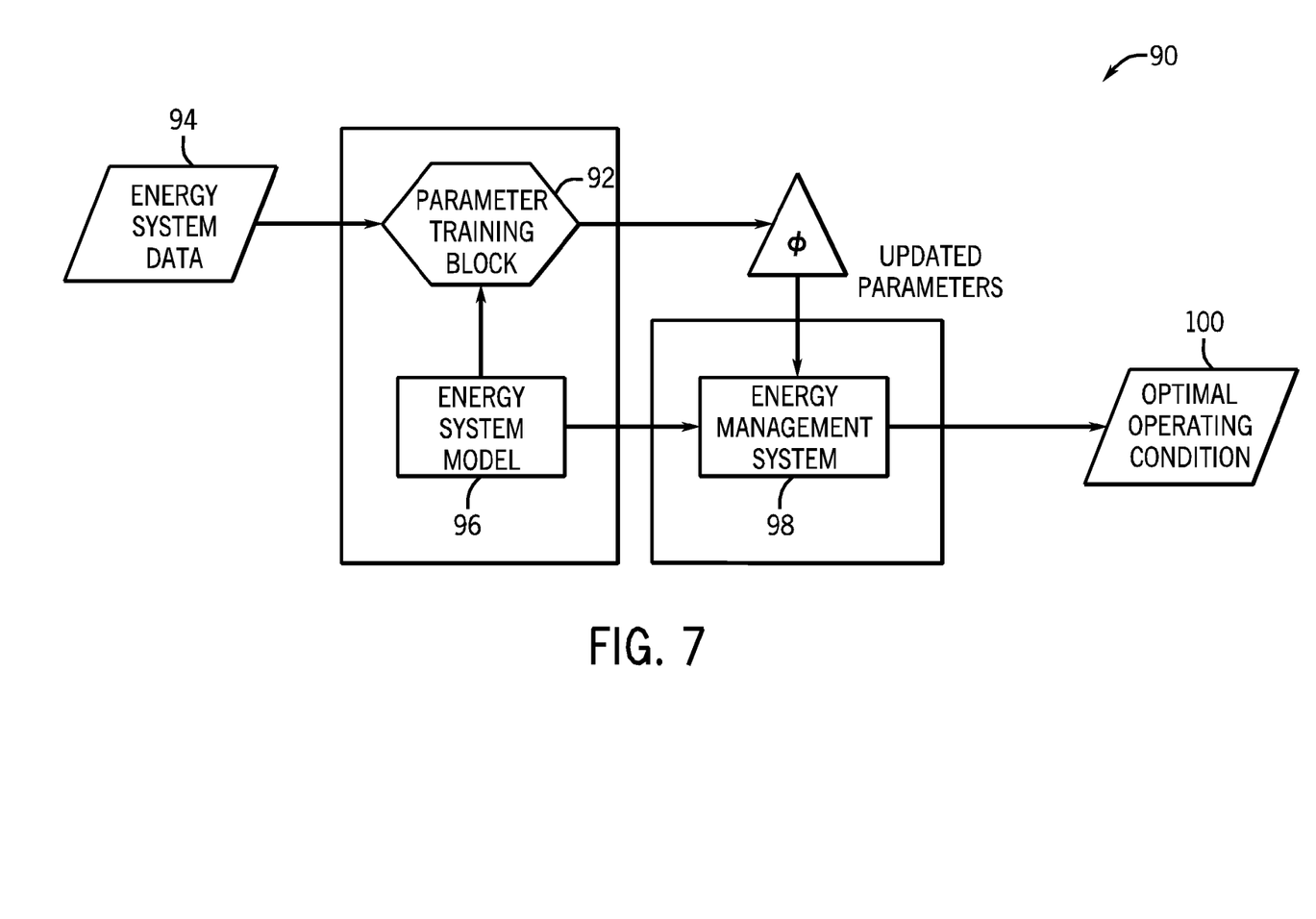
FIG. 7 is a block diagram of an exemplary framework for maintaining the parametric hybrid models defining the energy system.

FIG. 7 is a block diagram of an exemplary framework 90 for maintaining the parametric hybrid models 58 defining the energy system 10. As illustrated, the framework 90 may include a parameter training block 92, which may receive energy system data 94 (e.g., measurements from pressure, temperature, and flow sensors, weather prediction data, anticipated load profiles, and so forth) from the energy system 10, and input from an energy system model 96, which may include the integrated parametric hybrid model 82 of FIG. 6. The parameter training block 92 may iteratively update the set of all relevant model parameters $\Phi$, which may then be used by an energy management system 98, such as the parametric hybrid model-based optimal energy management system 86 of FIG. 6, to produce optimal operating conditions 100 (e.g., equipment schedules and setpoints for components of the energy system 10). As such, the framework 90 for implementing and maintaining the parametric hybrid models 58 and the associated parametric hybrid model-based optimal energy management system 86 may be self-maintaining through real-time adaptation of parameters given updated measurements from the energy system 10. The parameter training block 92 is generally a self-triggered optimization unit that determines the optimal set of parameters $\Phi$ for the energy system 10.

In addition, the components of the framework 90 of FIG. 7, as well as the parametric hybrid model-based optimal energy management system 86 of FIG. 6, may be deployed in a closed-loop manner to automate the energy system 10. More specifically, the closed-loop control may include: (1) measuring/retrieving current energy system data 94 for the energy system 10 and the current values for externally-provided inputs (e.g., operator inputs), (2) using the current data (potentially after data processing) to modify the parameter set $\Phi$ for the energy system model 96, the objective functions, and/or the constraint set (e.g., via a training process that is triggered either externally or by pre-defined triggering criteria), (3) initiating an optimization process to determine new optimal operating conditions 100 for the energy system 10, (4) implementing the optimal decisions in the energy system 10, and (5) iteratively repeating steps (1)-(4).

The disclosed embodiments are unique in both scope and methodology/algorithms for optimizing various energy systems 10. In particular, the disclosed embodiments are unique in scope inasmuch as they target all possible manifestations of energy produced and consumed by the energy system 10 (e.g., steam, chilled water, electricity, and so forth). In addition, the disclosed embodiments are unique in methodology/algorithms due to the use of parametric hybrid modeling technology to build computationally efficient and accurate models for the energy system 10, and ensure tractability of the optimization problem. One unique algorithmic/methodological property of the disclosed embodiments is the ability to systematically trade-off between accuracy and computational efficiency. For example, the parametric first-principles model 64 of FIG. 3 may be systematically simplified for improved computational efficiency (via system order reduction, for example), with the empirical model 60 and the parameter model 62 trained in conjunction with each simplified version of the parametric first-principles model 64, such that the overall parametric hybrid model 58 maintains a desired level of accuracy when compared to real system data. Another unique technical aspect of the disclosed embodiments is the self-maintaining capability of the parametric hybrid models 58. Constrained re-training of the parameters of the parametric hybrid models 58 (for components of the energy system 10, as well as the overall system-level model) is a unique feature of the disclosed parametric hybrid model-based optimal energy management system 86 as it allows the optimal energy management system 86 to remain current at all time. Another unique feature is that the parametric hybrid model-based optimal energy management system 86 may easily accommodate direct operator inputs to the problem function as objectives, constraints, and so forth, may all be captured by parametric hybrid models 58 as well.

It should be noted that as used herein, the terms "maximum", "minimum", and "optimum", may refer respectively to "substantially maximum", "substantially minimum", and "substantially optimum", where "substantially" indicates a value that is within some acceptable tolerance of the theoretical extremum, optimum, or target value. For example, in certain embodiments, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood relationships. Within these limitations, the control system will generally attempt to achieve optimum operation (i.e., operate at a targeted value or constraint (max or min) as closely as possible).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an energy system, comprising:
providing an integrated parametric hybrid model of an energy system for optimizing the energy system and determining desired trajectories over a temporal control horizon as control objectives, wherein the integrated parametric hybrid model comprises one or more parametric hybrid models of unit operation, one or more parametric hybrid models of constraints, and one or more parametric hybrid models of objective functions, each of the parametric hybrid models comprising one or more empirical models for generating values for one or more empirical model outputs, one or more parameter models for generating values for one or more fundamental model parameters of the energy system, and one or more parametric first principles models for generating values for one or more energy system outputs, wherein the fundamental model parameters correlate with, but are not the same as, inputs and outputs of the respective parametric hybrid model;
receiving operating information for the energy system;
receiving constraint information for the energy system;
receiving prediction information for the energy system;
executing the models of the parametric hybrid models of the integrated parametric hybrid model to generate the fundamental model parameters, and thereby automatically modifying the integrated parametric hybrid model and an optimization problem formulation for the energy system by online updating of the generated fundamental model parameters for each parametric hybrid model in accordance with the desired trajectories, the operating information, the constraint information, and the prediction information;
determining target values and optimal trajectories for a plurality of manipulated variables for the energy system using the modified integrated parametric hybrid model and the modified optimization problem formulation; and
controlling the energy system in accordance with the target values and the optimal trajectories.

2. The method of claim 1, comprising for each of the parametric hybrid models:
generating values for the one or more empirical model outputs using the one or more empirical models based at least in part on the operating information;
generating values for the one or more fundamental model parameters using the one or more parameter models based at least in part on the operating information and the one or more empirical model outputs; and
generating values for a first set of energy state variables and the one or more energy system outputs using the one or more parametric first principles models based at least in part on the operating information, the one or more fundamental model parameters, and a second set of energy state variables.

3. The method of claim 1, wherein each parametric hybrid model of unit operation models a different group of equipment of the energy system.

4. The method of claim 3, wherein each parametric hybrid model of unit operation is configured to determine optimal trajectories for fundamental model parameters of the respective parametric hybrid model, wherein the fundamental model parameters are different than input and output variables of the respective group of equipment.

5. The method of claim 4, wherein the groups of equipment relate to boiler processes, electrical generation processes, absorption chiller processes, or evaporative chiller processes.

6. The method of claim 5, wherein the groups of equipment collectively share common input and output variables based on fuel loop usage, electricity loop usage, condenser loop usage, evaporator loop usage, and steam loop usage, wherein the fundamental model parameters are different than the shared common input and output variables.

7. The method of claim 1, comprising iteratively updating the fundamental model parameters of the parametric hybrid models during operation of the energy system.

8. A non-transitory computer-accessible memory medium that stores program instructions for controlling an energy system, wherein the memory medium stores:
an integrated parametric hybrid model of an energy system, wherein the integrated parametric hybrid model comprises one or more parametric hybrid models of unit operation, one or more parametric hybrid models of constraints, and one or more parametric hybrid models of objective functions, each of the parametric hybrid models comprising one or more empirical models for generating values for one or more empirical model outputs, one or more parameter models for generating values for one or more fundamental model parameters of the energy system, and one or more parametric first principles models for generating values for one or more energy system outputs, wherein the fundamental model parameters correlate with, but are not the same as, inputs and outputs of the respective parametric hybrid model, the integrated parametric hybrid model comprising program instructions executable to:

receive operating information for the energy system;
receive constraint information for the energy system; and
receive prediction information for the energy system;
determine desired trajectories over a temporal control horizon as control objectives; and program instructions executable to:
execute the models of the parametric hybrid models of the integrated parametric hybrid model to generate the fundamental model parameters, and thereby automatically modify the integrated parametric hybrid model and an optimization problem formulation for the energy system by online updating of the generated fundamental model parameters for each parametric hybrid model in accordance with the desired trajectories, the operating information, the constraint information, and the prediction information;
determine target values and optimal trajectories for a plurality of manipulated variables for the energy system using the modified integrated parametric hybrid model and the modified optimization problem formulation; and
control the energy system in accordance with the target values and the optimal trajectories.

9. The memory medium of claim 8, wherein the integrated parametric hybrid model comprises program instructions executable to, for each of the parametric hybrid models:
generate values for the one or more empirical model outputs using the one or more empirical models based at least in part on the operating information;
generate values for the one or more fundamental model parameters using the one or more parameter models based at least in part on the operating information and the one or more empirical model outputs; and
generate values for a first set of energy state variables and the one or more energy system outputs using the one or more parametric first principles models based at least in part on the operating information, the one or more fundamental model parameters, and a second set of energy state variables.

10. The memory medium of claim 8, wherein each parametric hybrid model of unit operation models a different group of equipment of the energy system.

11. The memory medium of claim 10, wherein each parametric hybrid model of unit operation is configured to determine optimal trajectories for fundamental model parameters of the respective parametric hybrid model, wherein the fundamental model parameters are different than input and output variables of the respective group of equipment.

12. The memory medium of claim 11, wherein the groups of equipment relate to boiler processes, electrical generation processes, absorption chiller processes, or evaporative chiller processes.

13. The memory medium of claim 12, wherein the groups of equipment collectively share common input and output variables based on fuel loop usage, electricity loop usage, condenser loop usage, evaporator loop usage, and steam loop usage, wherein the fundamental model parameters are different than the shared common input and output variables.

14. The memory medium of claim 8, wherein the memory stores program instructions executable to iteratively updating the fundamental model parameters of the parametric hybrid models during operation of the energy system.

15. A system for controlling an energy system, comprising:
a non-transitory computer-accessible memory medium that stores:
an integrated parametric hybrid model of an energy system, wherein the integrated parametric hybrid model comprises one or more parametric hybrid models of unit operation, one or more parametric hybrid models of constraints, and one or more parametric hybrid models of objective functions, each of the parametric hybrid models comprising one or more empirical models for generating values for one or more empirical model outputs, one or more parameter models for generating values for one or more fundamental model parameters of the energy system, and one or more parametric first principles models for generating values for one or more energy system outputs, wherein the fundamental model parameters correlate with, but are not the same as, inputs and outputs of the respective parametric hybrid model, wherein the integrated parametric hybrid model is operable to:
receive operating information for the energy system;
receive constraint information for the energy system; and
receive prediction information for the energy system;
determine desired trajectories over a temporal control horizon as control objectives; and
a control system operable to:
execute the models of the parametric hybrid models of the integrated parametric hybrid model to generate the fundamental model parameters, and thereby automatically modify the integrated parametric hybrid model and an optimization problem formulation for the energy system by online updating of the generated fundamental model parameters for each parametric hybrid model in accordance with the desired trajectories, the operating information, the constraint information, and the prediction information;
determine target values and optimal trajectories for a plurality of manipulated variables for the energy system using the modified integrated parametric hybrid model and the modified optimization problem formulation; and
control the energy system in accordance with the target values and the optimal trajectories.

16. The system of claim of claim 15, wherein the integrated parametric hybrid model is operable to, for each of the parametric hybrid models:
generate values for the one or more empirical model outputs using the one or more empirical models based at least in part on the operating information;
generate values for the one or more fundamental model parameters using the one or more parameter models based at least in part on the operating information and the one or more empirical model outputs; and
generate values for a first set of energy state variables and the one or more energy system outputs using the one or more parametric first principles models based at least in part on the operating information, the one or more fundamental model parameters, and a second set of energy state variables.

17. The system of claim 15, wherein each parametric hybrid model of unit operation models a different group of equipment of the energy system.

18. The system of claim 17, wherein each parametric hybrid model of unit operation is configured to determine optimal trajectories for fundamental model parameters of the respective parametric hybrid model, wherein the fundamental model parameters are different than input and output variables of the respective group of equipment.

19. The system of claim 18, wherein the groups of equipment relate to boiler processes, electrical generation processes, absorption chiller processes, or evaporative chiller processes.

20. The system of claim 19, wherein the groups of equipment collectively share common input and output variables based on fuel loop usage, electricity loop usage, condenser loop usage, evaporator loop usage, and steam loop usage, wherein the fundamental model parameters are different than the shared common input and output variables.

* * * * *